US007817596B2

(12) United States Patent
New

(10) Patent No.: US 7,817,596 B2
(45) Date of Patent: Oct. 19, 2010

(54) VERIFICATION METHODS AND APPARATUS FOR IMPROVING ACQUISITION SEARCHES OF ASYNCHRONOUS CELLS

(75) Inventor: Wen Jing New, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 1284 days.

(21) Appl. No.: 09/948,240

(22) Filed: Sep. 6, 2001

(65) Prior Publication Data
US 2003/0045299 A1    Mar. 6, 2003

(51) Int. Cl.
*H04Q 7/00* (2006.01)
(52) U.S. Cl. ...................... 370/329; 370/350
(58) Field of Classification Search .............. 370/503, 370/509, 519, 512, 329, 342, 350; 380/261
See application file for complete search history.

(56) References Cited
U.S. PATENT DOCUMENTS

| 4,901,307 A | 2/1990 | Gilhousen et al. |
| 5,103,459 A | 4/1992 | Gilhousen et al. |
| 5,177,740 A | 1/1993 | Toy et al. ............... 370/100.1 |
| 6,256,235 B1 * | 7/2001 | Lee ...................... 365/189.11 |
| 6,363,060 B1 * | 3/2002 | Sarkar ...................... 370/342 |
| 2001/0021199 A1 * | 9/2001 | Lee et al. ................. 370/503 |
| 2002/0122557 A1 * | 9/2002 | Aihara et al. ............... 380/261 |

FOREIGN PATENT DOCUMENTS

| EP | 1202484 | 5/2002 |
| WO | 0213548 | 2/2002 |

OTHER PUBLICATIONS

Higuchi, et al: "Fast Cell Search Algorithm in Inter-Cell Asynchronous DS-CDMA Mobile Radio" IEICE Trans. Commun., vol. E81-B. No. 7: 1527-1534, Jul. 1998.
Kim, et al: "I/Q Multiplexedd Code Assignment for Fast Cell Search in Asynchronous DS/CDMA Cellular Systems" IEEE Communications Letters. vol. 2(6): 159-161, Jun. 1998.
Jun-Kui Ahn, et al: "New Cell Search Algorithm for Inter-Cell Asynchronous Mode DS/CDMA Mobile Radio System" Vehicular Technology Conference: 1336-1340, May 18, 1998.

(Continued)

*Primary Examiner*—Jayanti K Patel
*Assistant Examiner*—Jung Park
(74) *Attorney, Agent, or Firm*—Kyong Macek; Larry J. Moskowitz

(57) ABSTRACT

Methods and apparatus are presented to optimize the likelihood of a successful acquisition of frame timing information of an asynchronous base station by providing a mechanism that copes with short-term degradations caused by a dynamic radio environment. An acquisition search is performed in a plurality of stages, wherein a declaration indicating a failure at a stage is delayed through the use of a verification stage. The verification stage can be repeated a variable number of times. The number of repetitions of the verification stage can be dependent upon the stage at which the failure occurred. Declaration of failure occurs only after the predetermined number of verification searches have been performed.

18 Claims, 3 Drawing Sheets

OTHER PUBLICATIONS

3GPP TS 25.211 V4.2.0, 3rd Generation Partnership Project; Technical Specification Group Radio Access Network; Physical Channels and Mapping of Transport Channels onto Physical Channels (FDD)(Release 4)(Sep. 2001).

3GPP TS 25.212 V4.2.0, 3rd Generation Partnership Project; Technical Specification Group Radio Access Network; Multiplexing and Channel Coding (FDD)(Release 4)(Sep. 2001).

3GPP TS 25.213 V3.6.0, 3rd Generation Partnership Project; Technical Specification Group Radio Access Network: Spreading and Modulation (FDD)(Release 1999)(Jun. 2001).

3GPP TS 25.214, 3rd Generation Partnership Project: Technical Specification Group Radio Access Network; Physical Layer Procedures (FDD)(Release 1999)(Sep. 2001).

TIA/EIA/2000.2-A, Physical Layer Standard for cdma2000 Standards for Spread Spectrum Systems (Revision of TIA/EIA/IS-2000.2)(Mar. 2000).

TIA/EIA-95-A, Mobile Station-Base Station Compatibility Standard for Dual-Mode Wideband Spread Spectrum Cellular System (Revision of TIA/EIA/IS-95)(May 1995).

European Search Report, EP07011882 - European Patent Office, Jul. 11, 2007.

European Search Opinion, EP07011882 - European Patent Office, Jul. 23, 2007.

* cited by examiner

VERIFICATION METHODS AND APPARATUS FOR IMPROVING ACQUISITION SEARCHES OF ASYNCHRONOUS CELLS

BACKGROUND

1. Field

The present invention relates generally to communications, and more specifically, to a system for verifying search failures of asynchronous cell sites.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. Another CDMA standard is the W-CDMA standard, as embodied in 3$^{rd}$ Generation Partnership Project "3GPP", Document Nos. 3G TS 25.211, 3G TS 25.212, 3G TS 25.213, and 3G TS 25.214.

Transmissions between component parts of a WCDMA system can be sent in a time division duplex mode (TDD) or a frequency division duplex mode (FDD), in accordance with the frequency bands available to a service provider. Due to the complexity of permitting operations in either mode, the system transmits information in accordance with logical channels and physical channels. (Logical channels are also referred to as transport channels in the WCDMA standard.) Data is encoded and interleaved according to the logical channel to which the data is assigned, and the logical channels are then mapped onto physical channels. The number and types of logical channels and physical channels vary depending upon the direction the signal is being sent. Transmissions from the mobile station to the base station are referred to as the "uplink" and the transmissions from the base station to the mobile station are referred to as the "downlink."

On the uplink, the physical channels are the Physical Random Access Channel (PRACH), the Dedicated Physical Data Channels (DPDCH), the Dedicated Physical Control channel (DPCCH), and the Physical Common Packet Channel (PCPCH). On the downlink, the physical channels are the Synchronization Channel (SCH), the Common Pilot Channel (CPICH), the Primary Common Control Physical Channel (P-CCPCH), the Secondary Common Control Physical Channel (S-CCPCH), the Paging Indicator Channel (PICH), the Acquisition Indicator Channel (AICH), the Dedicated Physical Channel (DPCH), the Physical Downlink Share Channel (PDSCH), the Common Packet Channel (CPCH), and the CPCH Status Indicator Channel (CSICH).

Signals or data transmitted over a physical channel are carried in message entities, which are constructed using radio frames. Each radio frame comprises 15 slots and each slot corresponds to 2560 chips. A "chip" refers to a bit in a sequence formed after the original information signal is spread with a spreading code. Hence, each radio frame comprises 38,400 chips. However, message entities are variable in length since each message entity can comprise a variable number of radio frames. In the current WCDMA standard, radio frames are designated as 10 ms in duration, and message entities can be distributed and transmitted in 1, 2, 4, or 8 radio frames.

A WCDMA service provider may set up base stations in an asynchronous mode, such that each base station has an independent timing reference. In order to operate within the range of such asynchronous base stations, a mobile station must be able to acquire the frame timing of each base station with which the mobile station wishes to communicate. To receive and decode variable length message entities from a base station properly, the mobile station must first acquire the frame timing of the base station through an acquisition search for signals that convey the base station's frame timing information. Hence, if there are multiple base stations, the mobile station must conduct multiple acquisition searches for the timing of each base station.

The computational complexity and the amount of time required to conduct such acquisition searches can be extremely problematic for a mobile station that is traveling within the range of multiple base stations. In particular, if the mobile station moves from the range of one base station to the range of another base station, a delay in determining the frame timing signal acquisition of the new base station can result in dropped calls. The process of maintaining a call while the mobile station travels from the communication range of a base station to another base station is referred to as a "hand-off." Hand-offs can occur between sectors of a base station, between base stations of a single service provider, between base stations of different service providers, and between base stations operating at different frequencies. Hence, a traveling mobile station will likely experience the need to acquire frame timing information from multiple base stations.

Unfortunately, transmissions between mobile station and base stations are subject to a dynamic and random radio environment, wherein a phenomenon called "fading" causes fluctuations in the quality of the received transmissions. Fading occurs when multiple copies of the same signal arrive at a receiver at different phases, potentially causing destructive interference. Substantial multipath interference with very small delay spread can occur to produce flat fading of the entire frequency bandwidth.

Hence, a mobile station must be able to synchronize with the frame timing of a base station in the face of rapidly changing channel conditions, which can cause a mobile station to temporarily lose reception of signals from the base station. Presently in the art, if a mobile station loses reception of a signal during the frame timing acquisition process, the mobile station restarts the frame timing acquisition process again from the beginning. Restarting the frame timing acquisition process consumes time, wastes processing resources, and drains battery life. There is a present need in the art for a mechanism to cope with acquisition failures caused by unstable transmission environments without having to restart the acquisition process. The embodiments described herein satisfy the aforementioned need by implementing a verification searching mechanism for improving the probability of a successful acquisition search.

SUMMARY

Methods and apparatus are presented herein to address the above stated needs. In one aspect, a method is presented for increasing the likelihood of a successful acquisition of the timing of a base station by a mobile station, the method comprising: performing a frame timing acquisition search upon a transmission from the base station, wherein the frame timing acquisition search comprises a plurality of stages and the transmission comprises a plurality of radio frames; and performing a verification search after at least one of the plurality of stages if a failure is determined at the at least one of the plurality of stages.

In another aspect, apparatus is presented for increasing the likelihood of a successful acquisition of the timing of a base station by a mobile station, the apparatus comprising: a memory element; and a processor configured to execute a set of instructions stored in the memory element, the set of instructions for: performing an acquisition search upon a transmission from the base station, wherein the acquisition search comprises a plurality of stages and the transmission comprises a plurality of radio frames; and performing a verification search after at least one of the plurality of stages if a failure is determined at the at least one of the plurality of stages.

DETAILED DESCRIPTION

Figure 1:
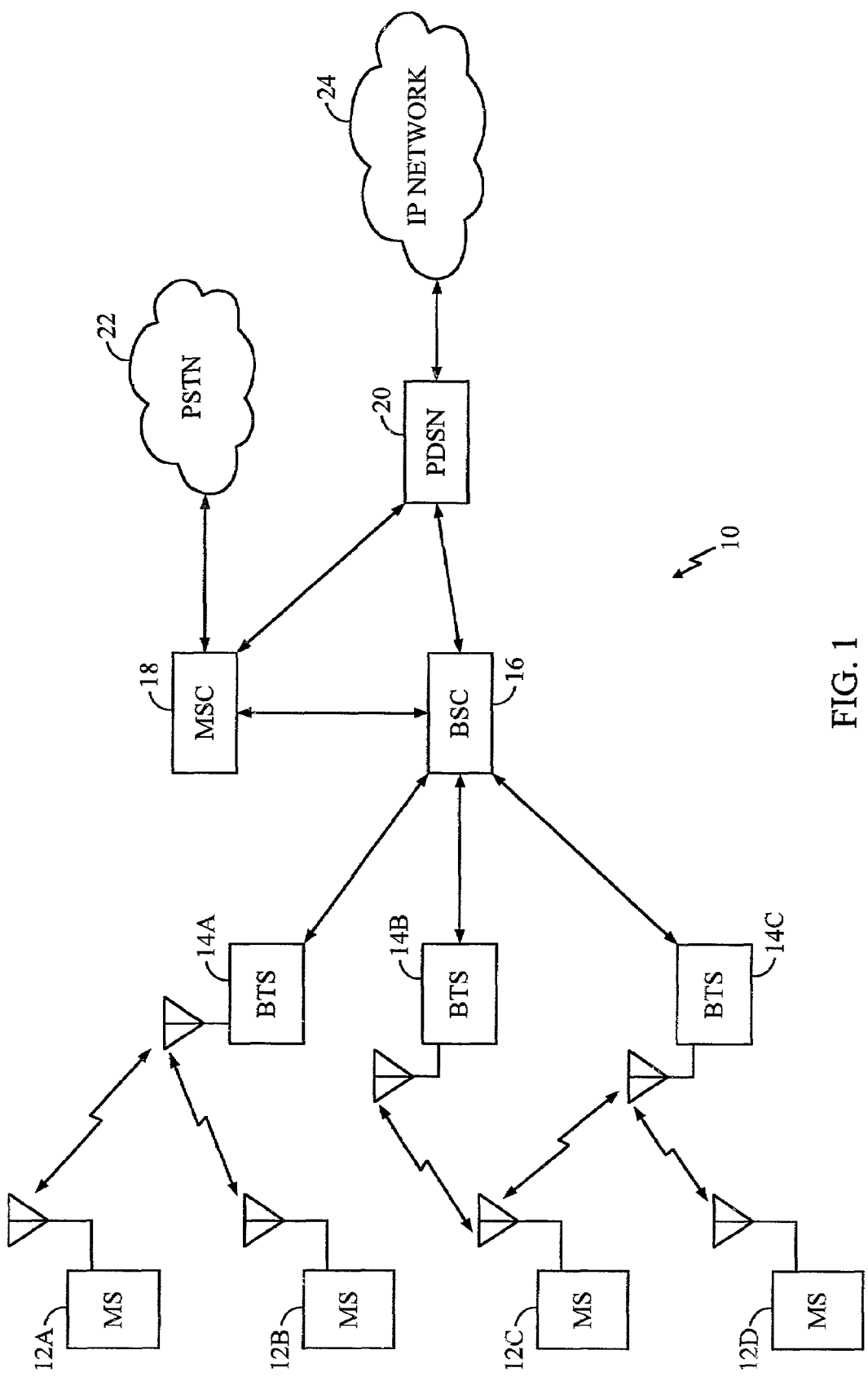
FIG. 1 is a diagram of a wireless communication network.

As illustrated in FIG. 1, a wireless communication network 10 generally includes a plurality of mobile stations (also called subscriber units or user equipment) 12a-12d, a plurality of base stations (also called base station transceivers (BTSs) or Node B). 14a-14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a-12d, three base stations 14a-14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a-12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a-12d may advantageously be configured to perform one or more wireless packet data protocols such as described in, for example, the EIA/TIA/IS-707 standard. In a particular embodiment, the mobile stations 12a-12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a-14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20.

During typical operation of the wireless communication network 10, the base stations 14a-14c receive and demodulate sets of uplink signals from various mobile stations 12a-12d engaged in telephone calls, Web browsing, or other data communications. Each uplink signal received by a given base station 14a-14c is processed within that base station 14a-14c. Each base station 14a-14c may communicate with a plurality of mobile stations 12a-12d by modulating and transmitting sets of downlink signals to the mobile stations 12a-12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a-12d from one base station 14a-14c to another base station 14a-14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

As stated previously, a WCDMA communication system can be set up with asynchronous base stations such that neighboring base stations have timing references that are independent from each other. In a hand-off situation between a first asynchronous base station and a second asynchronous base station, a mobile station will drop a call if the mobile station cannot be properly synchronized with the second asynchronous base station. In order to be synchronized with the second asynchronous base station, the mobile station must possess the frame timing information of the second asynchronous base station. In some implementations of the WCDMA system, the first asynchronous base station may possess the timing information of the second asynchronous base station already and convey this timing information to the mobile station. However, if the first asynchronous base station does not possess the timing information of the second asynchronous base station, then the mobile station is confronted with the task of determining the frame timing information by itself.

According to the WCDMA standard, the acquisition of timing information for a base station is implemented in a complex three-step process. In the First Step, the mobile station acquires the slot synchronization of a base station by searching for the Primary Synchronization Code (PSC) that is transmitted by the base station in the first 256 chips of each slot. The PSC is constructed using a generalized hierarchical Golay sequence and is always found at the beginning of a slot period. Hence, in order to determine the start of a 2560 chip slot period, the mobile station attempts to find correlation peaks of the PSC correlating all possible chip positions.

After the slot timing is determined, the mobile station must determine where the start of the radio frame may be. In the Second Step, the mobile station acquires the frame synchronization of the base station by searching for the sequences of the Secondary Synchronization Code (SSC) that are transmitted by the base station in the first 256 chips of each slot, along with the PSC. In the WCDMA standard, 64 sequences are constructed from 16 orthogonal SSCs to divide the 512 different Primary Scrambling Codes into 64 scrambling code groups. The search is performed by correlating the received signal with sequences constructed from possible SSCs and then identifying the maximum correlation value. Since the SSC sequences are constructed so that a cyclic shift of one sequence is not equivalent to a cyclic shift of any other sequence, the determination of the SSC sequence can be used to identify the primary scrambling code group associated with the SSC sequence.

In the Third Step, the mobile station determines the identity of the base station by correlating pilot symbols with all possible Primary Scrambling Codes in the code group identified through the Second Step search described above. A "pilot" signal carries no information bits. Pilot signals are typically constructed with known symbols that can be used as references for time, phase, and signal strengths. The known symbols are the result of using particular spreading or scrambling codes.

Each base station can be identified by a unique Primary Scrambling Code, which is repeated at the start of every 10 ms radio frame. The scrambling codes are divided into 512 sets, wherein each set comprises one Primary Scrambling Code and 15 Secondary Scrambling Codes. The Primary Scrambling Codes are also classified into 64 scrambling code groups, each consisting of 8 Primary Scrambling Codes. The code group that is searched in step three is identified by the SSC sequence found in the second step. Hence, once a code group is identified in Step 2, the search through 512 Primary Scrambling Codes is simplified to a search through 8 Primary Scrambling Codes.

Figure 2:
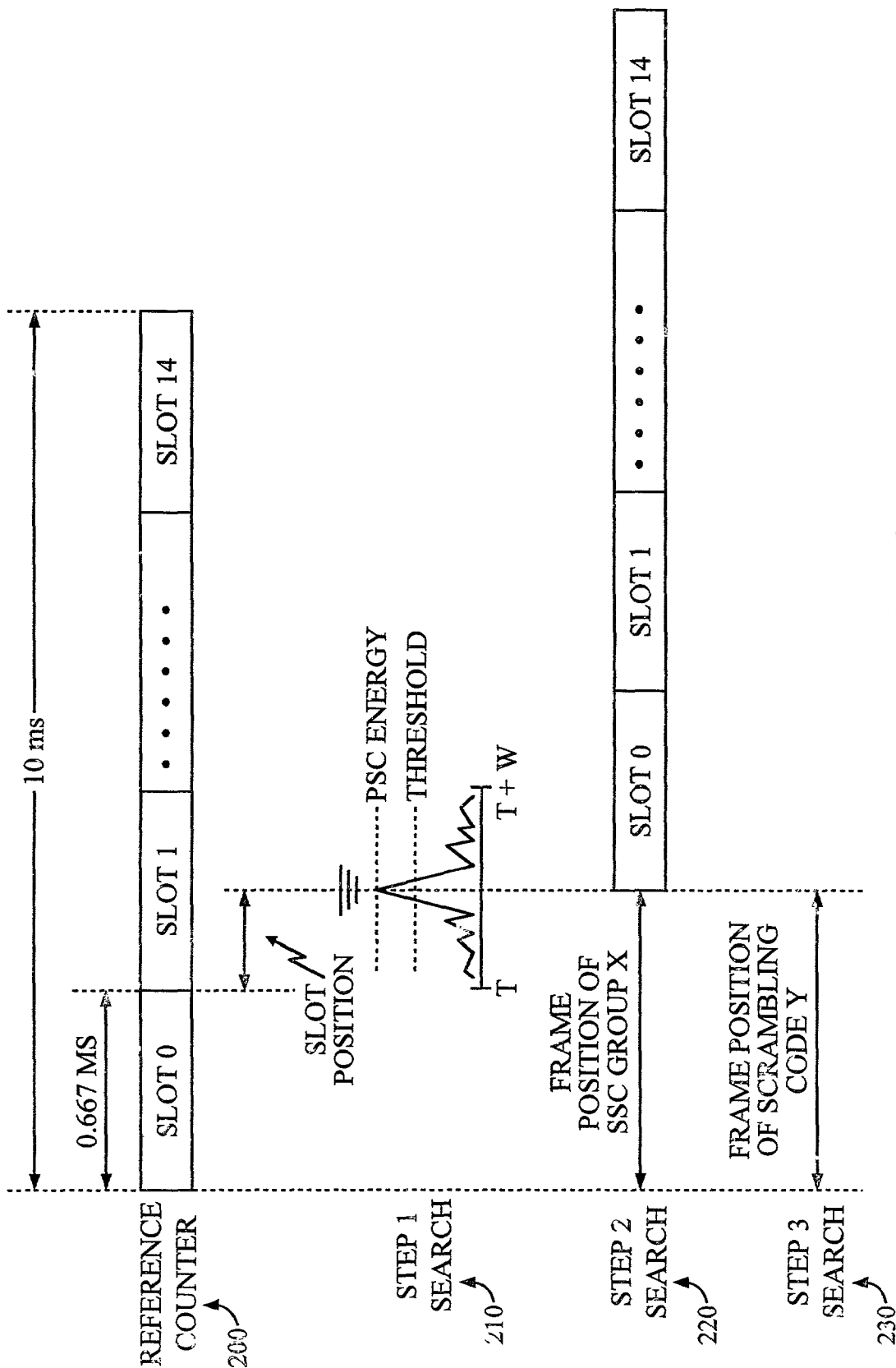
FIG. 2 is a timing diagram illustrating an acquisition search.

FIG. 2 illustrates the Three-Step frame acquisition search described above. A reference counter 200 represents a 10 ms radio frame comprising 15 slots that are 0.667 ms in duration. The First Step 210 searches for correlation peaks that are located at the start of the slots when a specific PSC is used. The Second Step 220 searches for the start of the radio frame by correlating slots with sequences constructed from SSCs. Once the start of the radio frame is identified, the Third Step 230 searches for the Primary Scrambling Code that is located in the first 256 chips at the start of the radio frame. Identification of the Primary Scrambling Code at the start of the radio frame serves to identify the base station that broadcast the radio frame.

Acquisition of the slot timing, frame timing, and base station identity are pre-requisites for a mobile station to successfully receive and decode messages from a base station. However, the process of acquiring frame timing information from unknown base stations is complicated by the variable nature of the transmission medium. As discussed above, fading can cause the transmission energy level of signal to fluctuate. If the mobile station cannot compensate for rapid changes in the radio environment, then a break in the Three-Step Frame Timing Acquisition process will occur. The mobile station is then forced to begin the Three-Step Frame Timing Acquisition process again because there is no compensation mechanism built into the aforementioned process. The embodiments herein describe methods and apparatus for implementing a frame timing acquisition process that is resilient to rapid changes in the transmission medium.

Figure 3:
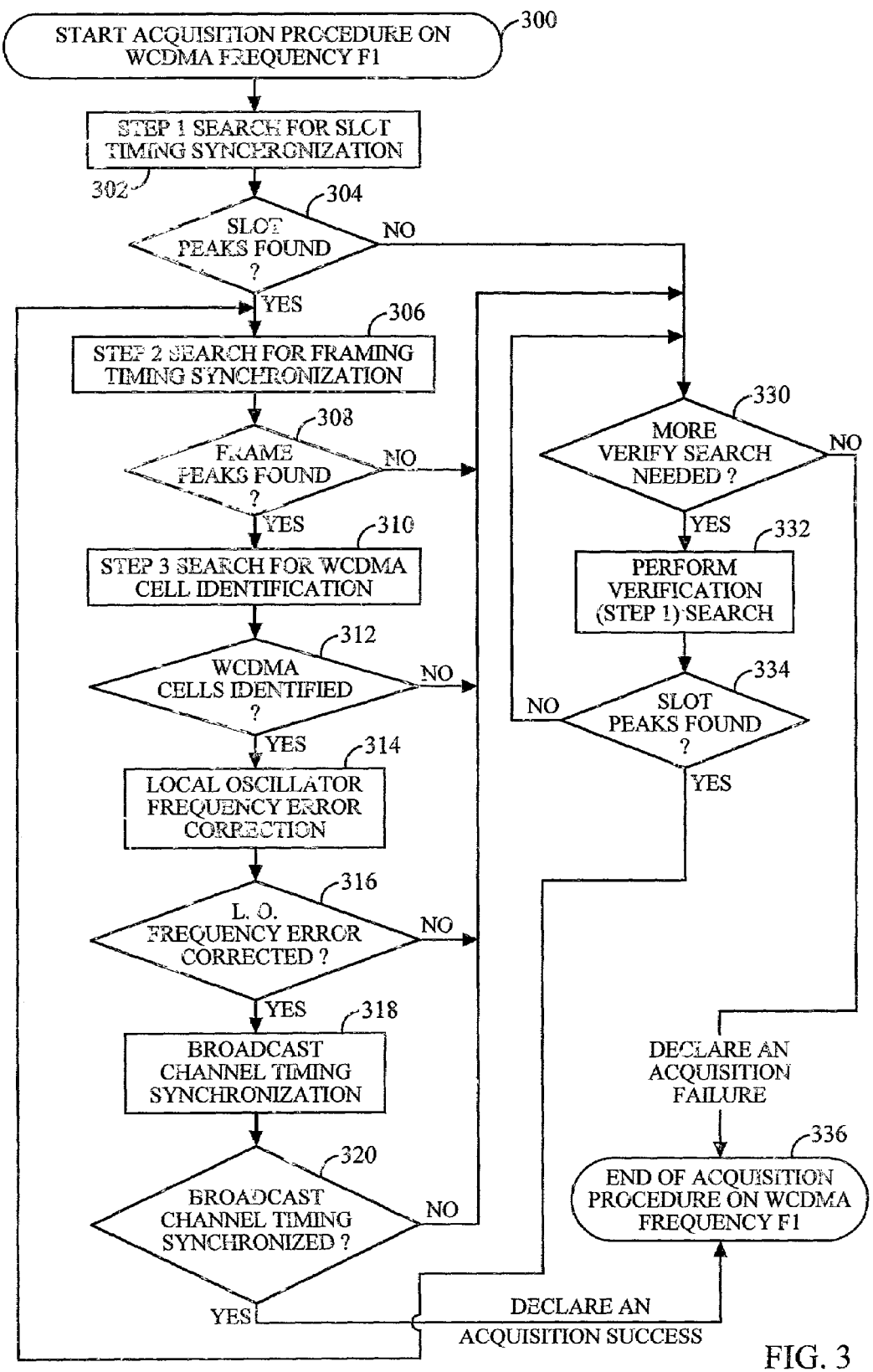
FIG. 3 is a flow chart illustrating a verification mechanism for increasing the likelihood of a successful acquisition search.

FIG. 3 is a flow chart that illustrates an embodiment of a frame timing acquisition procedure with a verification mechanism to optimize the likelihood of a successful result. The acquisition procedure can be implemented by an additional processing element and memory element within the mobile station, or the acquisition procedure can be introduced into processing elements and memory elements that are already present within the mobile station. At step 300, a mobile station starts the acquisition procedure by locking the demodulation elements within the mobile station onto a first frequency F1. At step 302, a processor within the mobile station controls the search for slot timing information through the use of Primary Synchronization Codes (PSCs). The search for slot timing information is performed in accordance with the First Step search described above for the Three-Step Frame Timing Acquisition Search. At step 304, the processor determines whether slot peaks have been found. If slot peaks are found, the program flow proceeds to step 306. If slot peaks are not found, the program flow proceeds to step 330.

The start of the verification process begins at step 330, wherein the processor verifies that further searches on the current frequency are needed. If further verification is needed, the program flow proceeds to step 332, wherein the processor implements a verification search. In one embodiment, a verification search can comprise a slot timing search, which uses PSCs. If a further verification search is not needed, then an acquisition failure is declared and the program flow proceeds to step 336, which is the end of the acquisition procedure on the first frequency F1.

If a verification search is implemented at step 332, then step 334 follows, wherein the results of the verification search are analyzed. If the results confirm that the frame timing acquisition procedure need not restart, then the program flow proceeds to step 306. If the results of the verification search indicate that the frame timing acquisition procedure may need to be restarted, the program flow proceeds back to step 330. In the embodiment wherein the verification search is a slot timing search, then a finding of slot peaks indicates that the frame timing acquisition procedure needs to be restarted. If slot peaks are not found, then no further frame timing acquisition procedure needs to be restarted.

At step 306, the processor searches for frame timing information by correlating the sequences of the Secondary Synchronization Codes (SSCs) during the demodulation of the received signals. The search for frame timing information is performed in accordance with the Second Step search described above for the Three-Step Frame Timing Acquisition Search. At step 308, the processor determines whether frame peaks have been found. If frame peaks are found, then the program flow proceeds to step 310. If frame peaks are not found, the program flow proceeds to step 330.

At step 310, the processor searches for the identity of the base station that is the subject of the present search by correlating pilot symbols with a scrambling code. The identification is performed in accordance with the Third Step search described above for the Three-Step Frame Timing Acquisition Search. At step 312, the processor determines whether the base station can be identified. If the base station is identified, then the program flow proceeds to step 314. If the base station cannot be identified, then the program flow proceeds to step 330.

Since the slot timing, the frame timing, and the identity of the transmitting base station are known after the successful completion of step 312, the processor within the mobile station can assign demodulation elements to the transmission channels of the base station. At step 314, the processor uses the pilot signal energy of the base station to determine a frequency correction value for the local oscillator.

At step 316, the processor determines whether the local oscillator can be corrected using a frequency tracking mechanism. The frequency tracking mechanism can be included within the demodulation elements of the mobile station or can be located separately from the demodulation elements. Frequency tracking mechanisms are well known in the art and will not be discussed further herein. If the frequency correction value cannot be implemented, then the program flow proceeds to step 330. If the frequency correction value can be implemented, the program flow proceeds to step 318.

At step 318, the processor attempts to synchronize the demodulation elements to the timing of the broadcast channel. At step 320, the processor determines whether a successful broadcast channel timing synchronization has occurred. If the mobile station cannot be synched to the broadcast channel, then the program flow proceeds to step 330. If the mobile station can be synched to the broadcast channel, the program flow proceeds to step 336, wherein an acquisition success is declared and the procedure ends.

The embodiments described above ensure that if a failure occurs at any step of the acquisition procedure, the mobile station can perform an additional verification search rather than declaring an immediate failure of the acquisition procedure. Hence, the additional verification search delays the failure of the acquisition procedure so that a rapid, temporary fluctuation in the radio environment will not cause a premature failure of the acquisition procedure.

The number of verification searches performed by the embodiments depends upon the stage where a failure may occur. At step 330, wherein the processor determines whether more verification searches are needed, the processor can use predetermined quantity values that correspond to the stage at which the verification search is called. For example, if a failure occurs at step 304, i.e., no slot peaks are found, then at step 330, the processor can refer to a lookup table that stores a low value, e.g., 1 or 2, for the total number of verification searches to be performed. However, if a failure occurs at step 320, i.e., the mobile station cannot be synchronized to the timing of the broadcast channel, then at step 330, the processor can refer to a lookup table that stores a higher value, e.g. 2 or 3, for the total number of verification searches to be performed. The actual range of numbers in the lookup table does not affect the scope of the embodiments herein.

The differences in the allowed number of verification searches are based upon the logical reasoning that a failure occurring at a later stage is more likely to be caused by a momentary fading or environmental condition rather than a radio frequency change and the reasoning that the presence of a pilot signal on the current radio frequency F1 has been proven by the successful completion of previous search stages.

It should be noted that the step of synchronizing the mobile station to the timing of the broadcast channel of the base station is a different timing problem from that of synchronizing the mobile station to the frame timing of the base station. As discussed above, the broadcasts from a WCDMA base station are sent on different physical channels that comprise variably sized message entities. A message entity unit is referred to as a Transmission Time Interval (TTI). The data sent within a TTI is convolutionally encoded (or encoded with turbo codes), undergo symbol repetition, and are interleaved. In the WCDMA standard, synchronizing the timing of the broadcast channel is performed in two phases. Phase One is the Primary Common Control Physical Channel synchronization, which is achieved by the Three-Step Search described above. Phase Two is a TTI synchronization, which is achieved by successfully decoding a broadcast channel message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. Apparatus for increasing the tolerance of a frame acquisition procedure to fluctuations in a dynamic radio environment, comprising:
   means for segmenting a frame timing acquisition search into a plurality of partial acquisition searches;
   means for interleaving a verification search between each of the plurality of partial acquisition searches; and
   means performing the verification stage if a failure is detected at one of the plurality of partial acquisition searches, wherein the means for performing the verification stage is further for repeating performance of the verification stage for a predetermined number of times, wherein the predetermined number of times varies in accordance with each of the plurality of partial acquisition searches.

2. The apparatus of claim 1, wherein the means for segmenting the frame timing acquisition search comprises:
   means for searching for slot timing information;
   means for searching for frame timing information; and
   means for searching for a base station identity.

3. A method for increasing the likelihood of a successful acquisition of the timing of a base station signal by a mobile station, comprising:
   acquiring slot timing at a first stage of a plurality of stages by correlating a primary synchronization code;
   acquiring frame timing at a second stage of said plurality of stages by correlating a secondary synchronization code;
   acquiring a cell identification at a third stage of said plurality of stages by correlating a primary scrambling code;
   performing a number of verification searches in accordance with the first stage if a failure is determined at anyone of the plurality of stages, wherein said number of verification searches performed is based on whether said failure occurred after said first, second or third stage, whereby the signal of a base station conveying timing is acquired.

4. The method as recited in claim 3 wherein said primary synchronization code, said secondary synchronization code and said primary scrambling code are related codes.

5. The method of claim 3, further comprising:
   determining a frequency correction value for a local oscillator within the mobile station;
   correcting the local oscillator in accordance with the frequency correction value; and
   synchronizing the mobile station to the timing of a broadcast channel of the base station.

6. The method of claim 5, further comprising:
   performing at least one verification search if the mobile station fails to correct the local oscillator in accordance with the frequency correction value or synchronize to the timing of the broadcast channel.

7. The method of claim 6, wherein said performing the at least one verification search is repeated if the mobile station fails to correct the local oscillator in accordance with the frequency correction value or synchronize to the timing of the broadcast channel.

8. An apparatus for increasing the likelihood of a successful acquisition of the timing of a base station by a mobile station, comprising:
   a memory element for storing a set of instructions;
   a processor element coupled with said memory element to execute said instructions for increasing the likelihood of said successful acquisition of the timing of said base station by said mobile station in accordance with the following steps:
      acquiring slot timing at a first stage of a plurality of stages by correlating a primary synchronization code;
      acquiring frame timing at a second stage of said plurality of stages by correlating a secondary synchronization code;
      acquiring a cell identification at a third stage of said plurality of stages by correlating a primary scrambling code;
      performing a number of verification searches in accordance with the first stage if a failure is determined at anyone of the plurality of stages, wherein said number of verification searches performed is based on whether said failure occurred after said first, second or third stage.

9. The apparatus as recited in claim 8 wherein said primary synchronization code, said secondary synchronization code and said primary scrambling code are related codes.

10. The apparatus of claim 8, wherein said processor further to execute the instructions in accordance with the following steps:
    determining a frequency correction value for a local oscillator within the mobile station;
    correcting the local oscillator in accordance with the frequency correction value; and
    synchronizing the mobile station to the timing of a broadcast channel of the base station.

11. The apparatus of claim 10, wherein said processor further to execute the instructions in accordance with the following steps:
    performing at least one verification search if the mobile station fails to correct the local oscillator in accordance with the frequency correction value or synchronize to the timing of the broadcast channel.

12. The apparatus of claim 11, wherein said performing the at least one verification search is repeated if the mobile station fails to correct the local oscillator in accordance with the frequency correction value or synchronize to the timing of the broadcast channel.

13. An apparatus for increasing the likelihood of a successful acquisition of the timing of a base station by a mobile station, comprising:
    means for acquiring slot timing at a first stage of a plurality of stages by correlating a primary synchronization code;
    means for acquiring frame timing at a second stage of said plurality of stages by correlating a secondary synchronization code;

means for acquiring a cell identification at a third stage of said plurality of stages by correlating a primary scrambling code; and means for performing a number of verification searches in accordance with the first stage if a failure is determined at anyone of the plurality of stages, wherein said number of verification searches performed is based on whether said failure occurred after said first, second or third stage.

14. The apparatus as recited in claim 13 wherein said primary synchronization code, said secondary synchronization code and said primary scrambling code are related codes.

15. The apparatus of claim 13, further comprising:

means for determining a frequency correction value for a local oscillator within the mobile station;

means for correcting the local oscillator in accordance with the frequency correction value; and means for synchronizing the mobile station to the timing of a broadcast channel of the base station.

16. The apparatus of claim 15, further comprising:

means for performing at least one verification search if the mobile station fails to correct the local oscillator in accordance with the frequency correction value or synchronize to the timing of the broadcast channel.

17. The apparatus of claim 16, wherein said means for performing the at least one verification search includes means for repeating if the mobile station fails to correct the local oscillator in accordance with the frequency correction value or synchronize to the timing of the broadcast channel.

18. A computer-program product for increasing the tolerance of a frame acquisition procedure to fluctuations in a dynamic radio environment, the computer-program product comprising a storage medium having stored instructions thereon, the instructions comprising:

code for segmenting a frame timing acquisition search into a plurality of partial acquisition searches;

code for interleaving a verification search between each of the plurality of partial acquisition searches; and code for performing the verification stage if a failure is detected at one of the plurality of partial acquisition searches, wherein performing the verification stage is repeated for a predetermined number of times, wherein the predetermined number of times varies in accordance with each of the plurality of partial acquisition searches.

* * * * *